(12) United States Patent
Okrongli et al.

(10) Patent No.: US 7,684,891 B2
(45) Date of Patent: Mar. 23, 2010

(54) SYSTEM AND METHOD FOR TOOL USE MANAGEMENT

(75) Inventors: Stefan Okrongli, Indianapolis, IN (US);
Robert J. Gorgol, Jr., Indianapolis, IN (US); Aleksandr Shkiler, Indianapolis, IN (US); Gerald Traicoff, Carmel, IN (US); Kishore Lankalapalli, Westfield, IN (US)

(73) Assignee: Hurco Companies, Inc., Indianapolis, IN (US)

( * ) Notice: Subject to any disclaimer, the term of this patent is extended or adjusted under 35 U.S.C. 154(b) by 167 days.

(21) Appl. No.: 11/890,384

(22) Filed: Aug. 6, 2007

(65) Prior Publication Data
US 2008/0033592 A1   Feb. 7, 2008

Related U.S. Application Data

(60) Provisional application No. 60/821,481, filed on Aug. 4, 2006.

(51) Int. Cl.
*G06F 19/00* (2006.01)
*G06K 1/04* (2006.01)
*G06K 1/14* (2006.01)
*G06K 1/08* (2006.01)
*G06K 1/10* (2006.01)
*B27C 9/00* (2006.01)

(52) U.S. Cl. .................. 700/179; 700/160; 700/169; 700/174; 700/175; 700/181; 234/13; 234/14; 234/20; 234/90; 234/64; 408/18; 408/21; 408/22

(58) Field of Classification Search ............... 700/160, 700/169, 174–175, 179, 181; 234/13–14, 234/20, 90, 94; 408/18–22
See application file for complete search history.

(56) References Cited

U.S. PATENT DOCUMENTS

| 3,576,979 | A | 5/1971 | McCall et al. |
| 3,602,090 | A | 8/1971 | Whetham |
| 3,679,955 | A | 7/1972 | Rhoades |
| 3,728,595 | A | 4/1973 | Adams |
| 3,838,258 | A | 9/1974 | Logan |
| 3,849,712 | A | 11/1974 | Lankford et al. |
| 3,860,805 | A | 1/1975 | Strukel |
| 3,882,304 | A | 5/1975 | Walters |

(Continued)

FOREIGN PATENT DOCUMENTS

EP    0553433    8/1993

(Continued)

OTHER PUBLICATIONS

International Search Report and Written Opinion for PCT/US2007/075280, 12 pages.

(Continued)

*Primary Examiner*—Ramesh B Patel
(74) *Attorney, Agent, or Firm*—Baker & Daniels LLP

(57) ABSTRACT

The present invention provides a system and method for tool use management wherein a CNC machine retains information identifying the tools associated with the machine as well as their current locations (if any), and executes an algorithm for determining the source tools needed by a part program and matching the source tools with the available tools.

37 Claims, 12 Drawing Sheets

U.S. PATENT DOCUMENTS

| | | | |
|---|---|---|---|
| 4,130,788 A | 12/1978 | Fiegehen et al. | |
| 4,131,837 A | 12/1978 | Whetham | |
| 4,208,718 A | 6/1980 | Chung | |
| 4,415,867 A | 11/1983 | Rubin | |
| 4,433,382 A | 2/1984 | Cunningham et al. | |
| 4,477,754 A | 10/1984 | Roch | |
| 4,490,781 A | 12/1984 | Kishi et al. | |
| 4,501,998 A | 2/1985 | Nozawa et al. | |
| 4,542,471 A | 9/1985 | Inabe et al. | |
| 4,543,625 A | 9/1985 | Nozawa et al. | |
| 4,571,686 A | 2/1986 | Torisawa | |
| 4,590,573 A | 5/1986 | Hahn | |
| 4,616,326 A | 10/1986 | Meier et al. | |
| 4,626,756 A | 12/1986 | Inaba et al. | |
| 4,635,206 A | 1/1987 | Bhatia et al. | |
| 4,723,203 A * | 2/1988 | Kishi et al. | 700/184 |
| 4,728,872 A | 3/1988 | Kishi et al. | |
| 4,739,488 A * | 4/1988 | Asakura | 700/179 |
| 4,750,105 A * | 6/1988 | Ohkawa et al. | 700/86 |
| 4,763,276 A | 8/1988 | Perreirra et al. | |
| 4,797,825 A | 1/1989 | Shimanuki et al. | |
| 4,833,617 A | 5/1989 | Wang | |
| 4,835,710 A | 5/1989 | Schnelle et al. | |
| 4,878,172 A | 10/1989 | Matsumura | |
| 4,884,373 A | 12/1989 | Suzuki et al. | |
| 4,901,220 A | 2/1990 | Matsumura et al. | |
| 4,908,555 A | 3/1990 | Ikeda et al. | |
| 4,926,311 A | 5/1990 | Matsumura et al. | |
| 4,959,597 A | 9/1990 | Kawamura et al. | |
| 4,963,805 A | 10/1990 | Suzuki et al. | |
| 4,973,895 A | 11/1990 | Torii et al. | |
| 5,028,855 A | 7/1991 | Distler et al. | |
| 5,060,164 A | 10/1991 | Yoneda et al. | |
| 5,062,755 A | 11/1991 | Lawrence et al. | |
| 5,089,950 A | 2/1992 | Miyata et al. | |
| 5,091,861 A | 2/1992 | Geller et al. | |
| 5,117,169 A | 5/1992 | Kakino et al. | |
| 5,134,570 A | 7/1992 | Nankaku | |
| 5,177,421 A | 1/1993 | Sasaki et al. | |
| 5,179,514 A | 1/1993 | Rastegar et al. | |
| 5,198,984 A | 3/1993 | Yamaguchi et al. | |
| 5,247,447 A | 9/1993 | Korncoff et al. | |
| 5,287,049 A | 2/1994 | Olomski et al. | |
| 5,288,209 A | 2/1994 | Therrien et al. | |
| 5,334,918 A | 8/1994 | McMurtry et al. | |
| 5,339,249 A | 8/1994 | Schaeffer | |
| 5,369,592 A | 11/1994 | Honda | |
| 5,375,064 A | 12/1994 | Bollinger | |
| 5,378,091 A | 1/1995 | Nakamura | |
| 5,378,218 A | 1/1995 | Diamaru et al. | |
| 5,402,367 A | 3/1995 | Sullivan et al. | |
| 5,453,933 A | 9/1995 | Wright et al. | |
| 5,471,395 A | 11/1995 | Brien | |
| 5,473,532 A | 12/1995 | Unno et al. | |
| 5,493,502 A | 2/1996 | Niwa | |
| 5,508,596 A | 4/1996 | Olsen | |
| 5,544,046 A | 8/1996 | Niwa | |
| 5,548,195 A | 8/1996 | Doran | |
| 5,604,677 A | 2/1997 | Brien | |
| 5,668,459 A | 9/1997 | Kim | |
| 5,682,319 A | 10/1997 | Boland et al. | |
| 5,687,084 A | 11/1997 | Wertz | |
| 5,723,961 A | 3/1998 | Fugino et al. | |
| 5,751,589 A | 5/1998 | Sato et al. | |
| 5,798,928 A | 8/1998 | Niwa | |
| 5,815,400 A * | 9/1998 | Hirai et al. | 700/173 |
| 5,825,017 A | 10/1998 | Pryor | |
| 5,827,020 A | 10/1998 | Fujita et al. | |
| 5,828,574 A | 10/1998 | Robinson et al. | |
| 5,844,804 A | 12/1998 | Schussler | |
| 5,871,391 A * | 2/1999 | Pryor | 451/9 |
| 5,892,345 A | 4/1999 | Olsen | |
| 5,917,726 A | 6/1999 | Pryor | |
| 5,919,012 A | 7/1999 | Nakagawa et al. | |
| 5,926,389 A | 7/1999 | Trounson | |
| 5,933,353 A * | 8/1999 | Abriam et al. | 700/182 |
| 5,946,449 A | 8/1999 | Dickerson et al. | |
| 5,991,528 A | 11/1999 | Taylor et al. | |
| 6,019,554 A | 2/2000 | Hong | |
| 6,052,628 A | 4/2000 | Hong | |
| 6,064,168 A | 5/2000 | Tao et al. | |
| 6,135,857 A | 10/2000 | Shaw et al. | |
| 6,163,735 A | 12/2000 | Yamada et al. | |
| 6,242,880 B1 | 6/2001 | Hong | |
| 6,291,959 B1 * | 9/2001 | Yoshida et al. | 318/569 |
| 6,310,621 B1 * | 10/2001 | Gagne et al. | 345/440 |
| 6,317,646 B1 | 11/2001 | de Caussin et al. | |
| 6,330,483 B1 | 12/2001 | Dailey | |
| 6,350,222 B2 | 2/2002 | Susnjara | |
| 6,368,879 B1 | 4/2002 | Toprac | |
| 6,400,998 B1 | 6/2002 | Yamazaki et al. | |
| 6,401,004 B1 | 6/2002 | Yamazaki et al. | |
| 6,438,445 B1 | 8/2002 | Yoshida et al. | |
| 6,456,897 B1 | 9/2002 | Papiernik et al. | |
| 6,470,225 B1 | 10/2002 | Yutkowitz | |
| 6,493,602 B1 | 12/2002 | Kranitzky et al. | |
| 6,521,856 B1 | 2/2003 | Marchesi et al. | |
| 6,535,788 B1 | 3/2003 | Yoshida et al. | |
| 6,587,747 B2 | 7/2003 | Hirai et al. | |
| 6,597,142 B2 | 7/2003 | Shibukawa et al. | |
| 6,643,563 B2 | 11/2003 | Hosek et al. | |
| 6,671,571 B1 * | 12/2003 | Matsumiya et al. | 700/172 |
| 6,675,061 B2 | 1/2004 | Hirai et al. | |
| 6,704,611 B2 | 3/2004 | Coleman et al. | |
| 6,766,216 B2 | 7/2004 | Erichsen et al. | |
| 6,772,038 B2 | 8/2004 | Kadono | |
| 6,774,598 B1 | 8/2004 | Kohler et al. | |
| 6,775,586 B2 | 8/2004 | Shibata et al. | |
| 6,782,306 B2 | 8/2004 | Yutkowitz | |
| 6,795,749 B2 | 9/2004 | Suh et al. | |
| 6,804,575 B2 | 10/2004 | Sagawa et al. | |
| 6,850,806 B2 | 2/2005 | Yutkowitz | |
| 6,865,499 B2 | 3/2005 | Yutkowitz | |
| 6,879,874 B2 | 4/2005 | Sinn | |
| 6,920,408 B2 | 7/2005 | Yutkowitz | |
| 6,922,606 B1 | 7/2005 | Yutkowitz | |
| 6,957,121 B2 | 10/2005 | Lottgen et al. | |
| 6,999,841 B1 * | 2/2006 | Rutkowski | 700/181 |
| 7,012,395 B2 | 3/2006 | Haunerdinger et al. | |
| 7,016,763 B2 | 3/2006 | Fauser et al. | |
| 7,050,883 B2 | 5/2006 | Cho et al. | |
| 7,096,087 B2 * | 8/2006 | Sagawa et al. | 700/160 |
| 2002/0103551 A1 * | 8/2002 | Tamamura | 700/86 |
| 2003/0065424 A1 | 4/2003 | Erichsen et al. | |
| 2005/0015223 A1 * | 1/2005 | Huang et al. | 703/1 |
| 2005/0049743 A1 | 3/2005 | Fauser et al. | |
| 2005/0055323 A1 * | 3/2005 | Zetek et al. | 707/1 |
| 2005/0085940 A1 | 4/2005 | Griggs et al. | |
| 2005/0131716 A1 * | 6/2005 | Hanan et al. | 705/1 |
| 2005/0162644 A1 * | 7/2005 | Watanabe | 356/237.1 |
| 2005/0188309 A1 | 8/2005 | Tasker et al. | |
| 2005/0190185 A1 | 9/2005 | Fauser et al. | |
| 2005/0246052 A1 | 11/2005 | Coleman et al. | |
| 2005/0251030 A1 | 11/2005 | Azar | |
| 2005/0256604 A1 | 11/2005 | Diehi et al. | |
| 2006/0050267 A1 * | 3/2006 | Murakami et al. | 356/237.2 |
| 2006/0149410 A1 | 7/2006 | Erichsen et al. | |

FOREIGN PATENT DOCUMENTS

| | | |
|---|---|---|
| EP | 1229413 | 8/2002 |
| JP | 56076354 A | 6/1981 |
| JP | 57114325 | 7/1982 |
| JP | 62130130 | 6/1987 |

| | | |
|---|---|---|
| WO | WO9222023 | 12/1992 |

OTHER PUBLICATIONS

Bullock, T., "Motion Control and Industrial Controllers," Motion Control, Sep./Oct. 1990.

"Automated Manufacturing Inspection System," NTIS Tech Notes, U.S. Department of Commerce, Springfield, VA, Feb. 1, 1991, p. 179, 1&2.

Imamura, Fumihiko and Kaufman, Howard, "Time Optimal Contour Tracking for Machine Tool Controllers," IEEE Control Systems, Apr. 1991.

Berthiaume, D., "Justification for AC vs. DC Drive Systems," Pulp and Paper Industry Technical Conference, Conference Record of 1991 Annual Volume, Jun. 3-7, 1991, pp. 234-238.

Chuang, Hua-Yi and Liu, Chang-Huan, "A Model-Referenced Adaptive Control Strategy for Improving Contour Accuracy of Multiaxis Machine Tools," IEEE Transactions on Industry Applications, vol. 28., No. 1., Jan./Feb. 1992.

Bullock, T., "Linear and Circular Interpolation," Motion Control, Apr. 1992.

Wilson, C., "How Close Do You Have to Specify Points In a Contouring Application?", Motion Control, May 1993.

Goto, Satoru and Nakamura, Masatoshi, "Accurate Contour Control of Mechatronic Servo Systems Using Gaussian Networks," IEEE Transactions on Industrial Electronics, vol. 43., No. 4, Aug. 1996.

Yeh, Zong-Mu, "Cross-Coupled Fuzzy Logic Control for Biaxial Servomechanisms," IEEE 1996.

Lee, Je-Hie, Huh, Uk-Youl and Park, Ho-Joon, "Improved Contouring Control for Multi-Axis System with Two-Degrees-of-Freedom Structure," International Symposium on Industrial Electronics (ISIE), Guimaraes, Portugal, pp. 901-905, 1997.

Yeh, Syh-Shiuh and Hsu, Pau-Lo, "Theory and Applications of the Robust Cross-Coupled Control Design," Proceedings of the American Control Conference, Albuquerque, New Mexico, Jun. 1997.

Li, Perry Y., "Coordinated Contour Following Control for Machining Operations—A Survey," Proceedings of the American Control Conference, San Diego, California, Jun. 1999.

Lee, Hyun C. and Jeon, Gi J, "Real-time Compensation of Two-dimensional Contour Error in CNC Machine Tools," Proceedings of the 1999 IEEE/ASME International Conference on Advanced Intelligent Mechatronics, Sep. 19-23, 1999, Atlanta, USA.

Lacerda, Helder Barbieri and Belo, Eduardo Morgado, "A Modified Contour Error Controller for a High Speed XY Table," Journal of the Brazilian Society of Mechanical Sciences, vol. 22., No. 3, pp. 443-455, 2000.

Yeh, Syh-Shiuh and Hsu, Pau-Lo, "A New Approach to Biaxial Cross-coupled Control," Proceedings of the 2000 IEEE, International Conference on Control Applications, Anchorage, Alaska USA, Sep. 25-27, 2000.

Chiu, George T.-C., and Tomizuka, Masayoshi, "Contouring Control of Machine Tool Feed Drive Systems: A Task Coordinate Frame Approach," IEEE Transactions on Control Systems Technology, vol. 9, No. 1., Jan. 2001.

Yeh, Syh-Shiuh and Hsu, Pau-Lo, "Estimation of the Contouring Error Vector for the Cross-Coupled Control Design," IEEE/ASME Transactions on Mechatronics, vol. 7., No. 1., Mar. 2002.

Chen, Shyh-Leh, Liu, Hung-Liang and Ting, Sing Ching, "Contouring Control of Biaxial Systems Based on Polar Coordinates," IEEE/ASME Transactions on Mechatronics, vol. 7., No. 3., Sep. 2002.

Hsieh, Chen-Chou, Wang, An-Ping and Hsu, Pau-Lo, "CAN-Based Motion Control Design," SICE Annual Conference in Fukui, Aug. 4-6, 2003, Fukui University, Japan.

Wang, Lisong and Zhang, Jing, "The Research of Static De-coupled Contour Control Technique of the Ultra-precision Machine Tool," Proceedings of the 5th World Congress on the Intelligent Control and Automation, Jun. 15-19, 2004 Hangzhou, China.

Xiao, Yong, Zhu, Kuanyi and Liaw, Hwee Choo, "Generalized Synchronization Control of Multi-axis Motion Systems," www.sciencedirect.com, Control Engineering Practice, vol. 13, pp. 809-819, 2005.

John Kieffer, Aidan J. Cahill, and Matthew R. James, "Robust and Accurate Time-Optimal Path-Tracking Control for Robot Manipulators," IEE Transactions on Robotics and Automation, vol. 13, No. 6, Dec. 1997.

John Kieffer, Aidan J. Cahill, and Matthew R. James, "Time-Opitamal Path Tracking to a Specified tolerance in the Presence of Plant Uncertaintu," Australian National University, 1995.

L.M. Galantucci, L. Tricarico, and A Dersha, "Automatic Clamping Selection in Process Planning using Tolerance Verification Algorithms," Advanced Manufacturing Systems and Technology, Springer Verlag, Wein, New York, 1996.

Ales Hace, et al., "Rubust Motion Control and Trajectory Planning for Planar Laser Cutting System," IEEE Advanced Motion Control Proceedings Coimbra, 1998.

Hong C. Zhang and J. Mei, "Automated Tolerance Anaysis for CAPP System," International Journal of Advance Manufacturing Technology, 10:219-224, 1995.

Parimal Kopardekar and Sam Anand, "Tolerance Allocation using Neural Networks," International Journal of Advance Manufacturing Technology, 10:269-276, 1995.

M.M. Sfantiskopoulos, et al., "Concurrent Dimensioning for Accuracy and Cost," International Journal of Advance Manufacturing Technology, 10:236-268m 1995.

O.H. Chai, et al., "An Interpolation Scheme for Tool-Radius Compensated Parabolic Paths for CNC," IIE Transactions, 28:11-17, 1996.

Y.D. Chen, J. Ni, and S.M. Wu, "Real-Time CNC Tool Path Generation for Machining IGES Surfacs," Transactions of the ASME, vol. 115, Nov. 1993.

G.S. Li, et al., "In-Process Drilling States Monitoring in Machine Centre By Time Series Analysis," International Conference on Manufacturing Autmation, vol. 1712, 1992.

\* cited by examiner

Fig. 8

SYSTEM AND METHOD FOR TOOL USE MANAGEMENT

RELATED APPLICATIONS

This application claims the benefit of U.S. Provisional Application Ser. No. 60/821,481, filed on Aug. 4, 2006, the entire disclosure of which is expressly incorporated herein by reference.

FIELD OF THE INVENTION

The present invention relates generally to managing the use of tools loaded onto or associated with a computer numerically controlled ("CNC") machine, and more particularly to algorithms for matching tools required by a program for creating a machined part to tools available for use by a particular machine or at least described by data accessible by the machine.

BACKGROUND OF THE INVENTION

CNC machines use various tools (e.g., drills, end mills, reamers, taps, etc.) held by a movable, rotating spindle under the control of a program to form material such as metal into predetermined shapes or "parts." Often several different tools are required to create a part from stock material, each tool performing a function as specified by the part program. Many CNC machines have an associated automatic tool changer ("ATC") to speed the process of changing tools during execution of a part program. As is known in the art, such ATCs have many tool stations, each holding a particular tool which the ATC automatically indexes to a loading position for mounting to the spindle as required by the part program. Tools may also be changed manually. Generally, tools for manual loading that are used frequently by a particular machine are kept near the machine and are often mounted in tool holders. The locations of these tools for manual loading are collectively referred to as the manual tool changer ("MTC"). The various tools associated with a particular machine, either mounted in the spindle, mounted in the ATC, or available in the MTC, are referred to herein as the available tools.

Conventionally, to run a part program on a particular CNC machine, the operator had to determine from the part program the tools necessary to complete the part, and ensure that those tools were loaded, for example, in the ATC tool station locations expected by the part program. Alternatively, if a required tool was already loaded in the machine, but in a location different from that expected by the part program, the operator could modify the part program to reflect the actual location of the tool. Either way, the operator had to determine what tools were needed, identify the available tools, manually match the available tools with the needed tools, and correlate the actual locations of the available tools with the location designations of the needed tools specified by the part program. This process is slow and subject to error.

SUMMARY OF THE INVENTION

The present invention provides a system and method for tool use management wherein the CNC machine retains information identifying the available tools for the machine as well as their current locations, and executes an algorithm for determining the tools needed by the part program (hereinafter, "source tools") and matching the source tools with the available tools. Each machine's memory (or a distributed memory, as further described below) is populated with tool information (including the actual location of the tool) when the available tools are initially loaded onto, replaced, or associated with the machine, and the part program is modified based on that tool information to correlate the source tools with the available tools. Consequently, the part program may be executed on any of a plurality of machines, each having a different configuration of available tools, without manually changing the locations of the available tools or manually modifying the part program to reflect the locations of the available tools.

The machine's memory may also retain information describing tools that are not currently available at the machine. Source tools may be matched to these unavailable tools to perform virtual operations on the machine. Alternatively, the operator may be informed that a tool required by a part program is unavailable at the machine, but defined by information in the machine's memory. The operator may then obtain the tool and add it to the available tools for the machine. The data maintained in the machine's memory describing the available tools and the defined, but unavailable tools (collectively referred to herein as "defined tools") includes information about the physical characteristics and/or use of the tools. Throughout this description, this collection of data is referred to as "the tool library."

In one embodiment of the invention, the memory associated with the machine also includes a tool database from which tools may be defined for storage in the tool library. The tool database may include a three-dimensional arrangement of tool information whereby the physical characteristics (e.g., tool diameter) and/or use information (e.g., spindle speed) for a tool may be accessed given a basic tool identifier (hereinafter, "the tool type"; e.g., drill) and the material to be machined by the tool (e.g., aluminum). Using a graphical user interface, the operator may populate the tool database (by selecting or typing information or importing information from a source location), and/or use the populated database to generate defined tools for the tool library.

In another embodiment of the invention, source tools that are not identically matched to defined tools are identified as unmatched tools. These unmatched tools may be matched to similar, but not identical, defined tools of the same tool type. A special case is an "unknown" tool type, which can be matched to similar defined tools of any type. The matching of the defined tools to the unmatched tools may be performed by the operator using the graphical user interface.

In yet another embodiment of the present invention, the algorithm for identifying the source tools and matching the source tools to the defined tools is used during importation of defined tools into the tool library to compare the imported defined tools with the previously defined tools to ensure that duplicates are not imported.

The above mentioned and other features of this invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIGS. 7 and 8 are tool set up screens generated by software according to the present invention.

Figure 1:
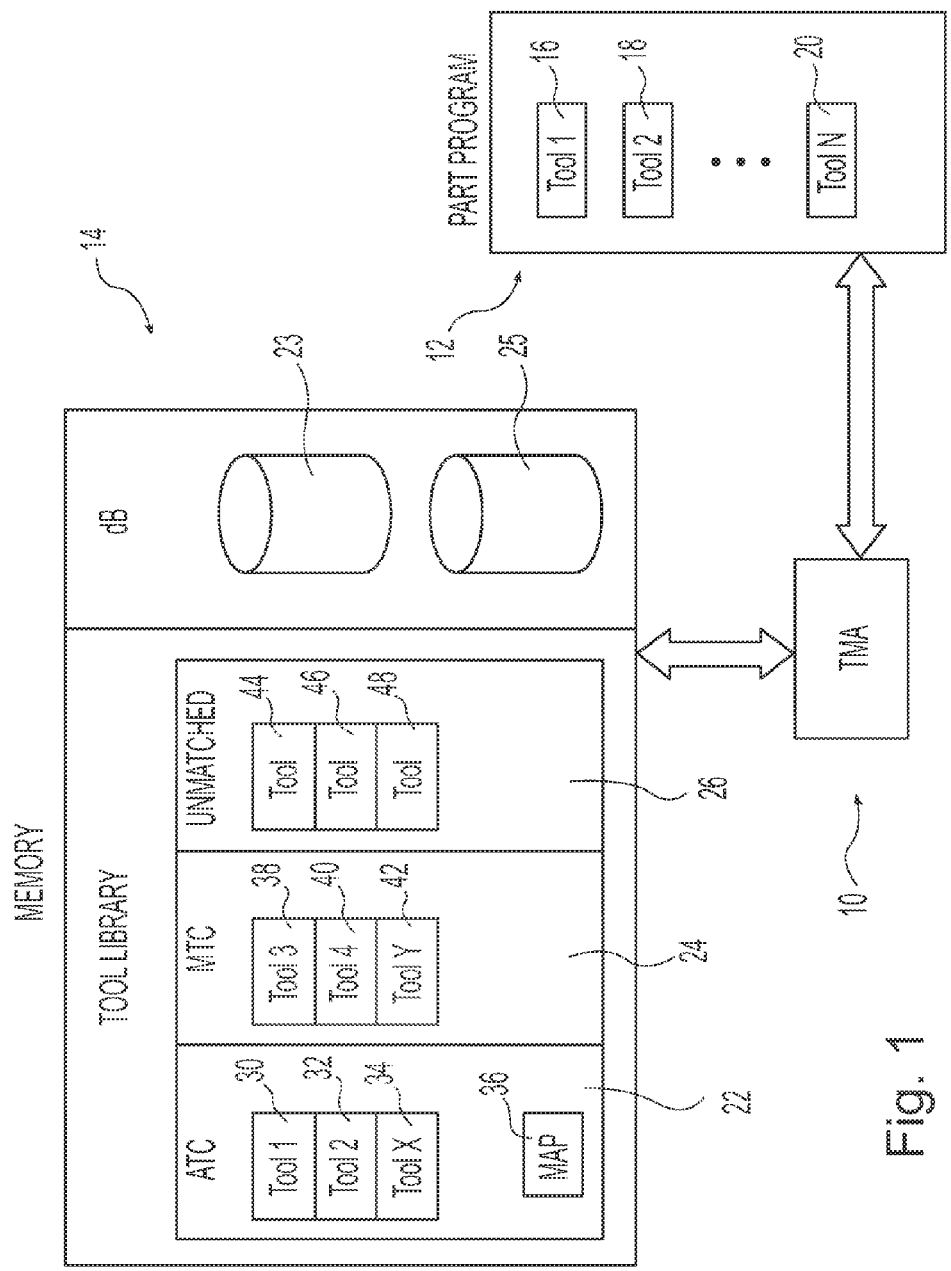
FIG. 1 is a conceptual diagram of software components associated with the present invention.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF EMBODIMENTS OF THE INVENTION

The embodiments disclosed below are not intended to be exhaustive or to limit the invention to the precise forms disclosed in the following detailed description. Rather, the embodiments are chosen and described so that others skilled in the art may utilize their teachings.

FIG. 1 conceptually depicts a tool management algorithm ("TMA") 10, a part program 12, and a machine memory 14. TMA 10 is described in greater detail below. Part program 12 represents code for operation on a CNC machine to create a part. Part program is generated using a conversational programming technique as developed by Hurco Companies, Inc. of Indianapolis, Ind. and described in U.S. Pat. No. 5,453, 933, the disclosure of which is expressly incorporated herein by reference. Part program 12 includes a plurality of commands and other information used by the machine to move the spindle or the part, adjust the speed of spindle rotation, change tools, etc. The commands and other information may be organized into sections or blocks representing operations 16, 18, 20 to be performed on the part. Each operation 16, 18, 20 may include a numeric reference to a tool (e.g., tool 1, tool 2, tool n) needed to perform the corresponding operation 16, 18, 20. Operations 16, 18, 20 further includes information describing the physical characteristics of the tools, including the tool type and geometry, and information describing the manner in which the tool is to be used. The tool use information may include tool feed and speed specifications. As is known in the art, tool feed specifies how quickly the tool may be moved across the material, and tool speed specifies how quickly to tool should be rotated. These parameters affect, among other things, the throughput of the machine and the surface finish of the part. Unless otherwise stated or made clear by context, references throughout this description to "source tools" are short hand for information about a tool associated with a particular operation 16, 18, 20, including its numeric reference and the data describing its physical characteristics and use specifications. It should be understood that while only three operations 16, 18, 20 are shown in FIG. 1, any number of operations may be included in part program 12.

Machine memory 14 conceptually includes a tool library 21, a tool database 23, and a materials database 25. Tool database 23 includes information describing tools and materials database 25 includes information describing materials to be machined by the tools, as is further described below. For a plurality of tools, tools database 23 generally associates default use information (i.e., feeds and speeds) for roughing and finishing operations on different workpiece materials. Materials database 25 may be used in creating tools database 23, as materials database 25 describes the characteristics of the various workpiece materials. Materials database 25 may also be used in creating verification graphics (i.e., simulations displayed to the operator to demonstrate use of part program 12 to form a part) that more realistically depict the actual workpiece. Moreover, materials database 25 may be used in the tool life management functions of the machine to estimate tool wear over time based on the hardness characteristics of the material.

Tool library 21 includes defined tools as is further described below, which are depicted in FIG. 1 as arranged in ATC grouping 22, MTC grouping 24, and unmatched grouping 26. Groupings 22, 24, 26 are merely intended to indicate that certain of the defined tools in tool library 21 are associated with the ATC or the MTC, and other defined tools (unmatched grouping 26) are not associated with the ATC or the MTC. ATC grouping 22 is depicted as including defined tools 30, 32, 34. MTC grouping 24 is depicted as including defined tools 38, 40, 42. Unmatched grouping 26 is depicted as including source tools 44, 46, 48. Defined tools 30, 32, 34, 38, 40, 42, 44, 46, 48 include the same types of information as source tools (i.e., numeric references and data describing physical characteristics and use specifications). Accordingly, unless otherwise stated or made clear by context, references throughout this description to "defined tools" are short hand for information about a tool associated with the machine, including its numeric reference and data describing its physical characteristics and use specifications.

Machine memory 14 further includes a map 36 associated with ATC grouping 22. Map 36 includes information describing the physical position in the machine's ATC of the physical tools described by defined tools 30, 32, 34 of ATC grouping 22.

As should be apparent to one skilled in the art, memory 14 may be a distributed memory including multiple memory devices at various physical locations which are accessible by the machine (or multiple machines), either directly or over a wired or wireless network. Alternatively, memory 14 may reside entirely on the machine. As is further described below, defined tools 44, 46, 48 (only three shown to simplify the description) of unmatched grouping 26 are source tools from program 12 that do not match any defined tools in ATC grouping 22 or in MTC grouping 24 of tool library 21. Even if defined tools 44, 46, 48 remain unmatched, the data may be used by the machine to perform virtual operations as is further described below.

When part program 12 is loaded onto a machine (e.g., transferred from a portable media to the machine controller or otherwise received by the controller from a source location), TMA 10 is executed. Various steps of TMA 10 are depicted in flow diagram 50 of FIG. 2. Initially, TMA 10 processes the content of part program 12 to identify the source tools associated with operations 16, 18, 20. In this example, the source tools specified for operations 16, 18, 20 have numeric references 1, 2, and N, respectively. TMA 10 generates a listing of the source tools to be processed during loading of part program 12, including their numeric references and data describing their physical characteristics and use specifications. At step 52, TMA 10 determines whether the source tools need to be matched to defined tools included in tool library 21. Initially, none of the source tools have been matched, so control is passed to step 54. TMA 10 then accesses source tool 16 and calls (step 56) a process control routine 58 (FIG. 3) to process source tool 16.

Figure 3:
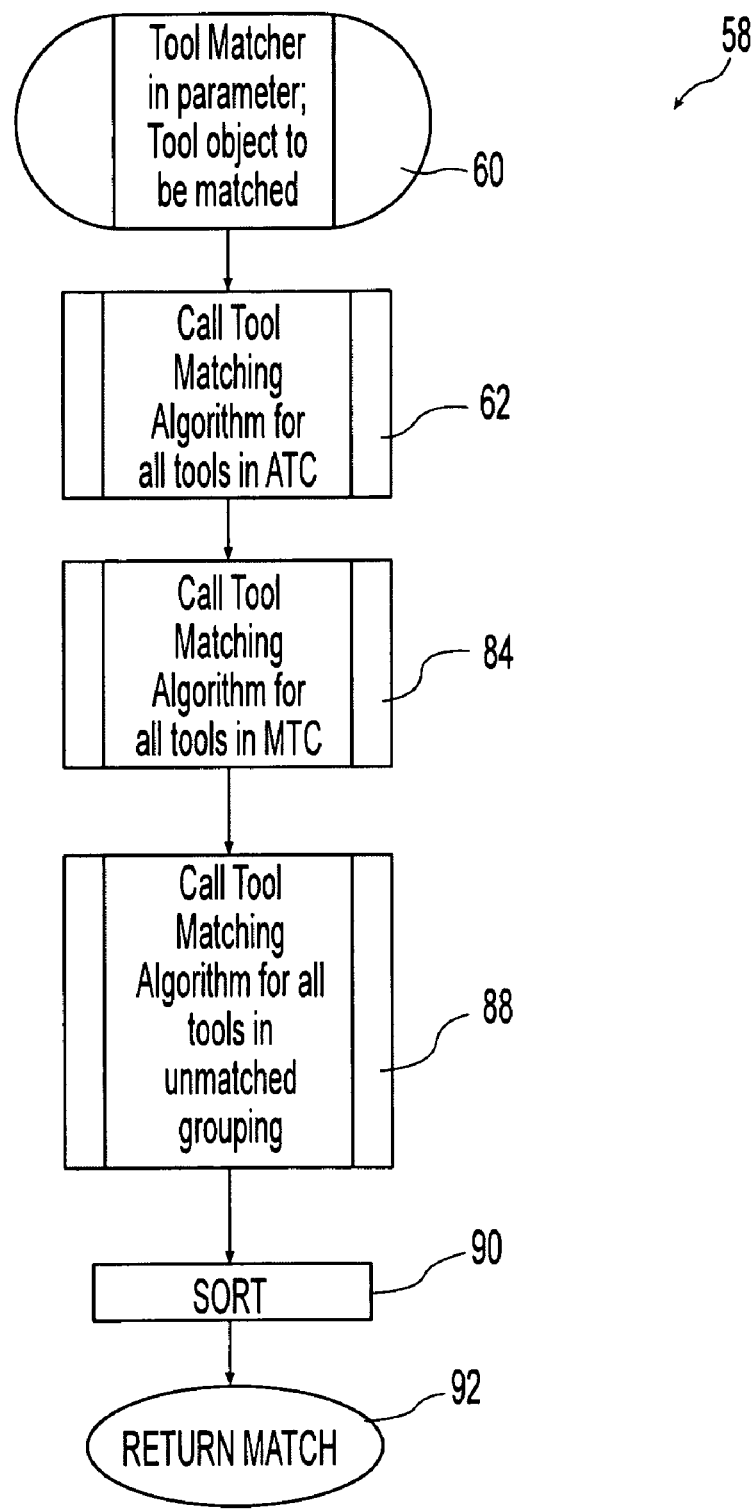
FIG. 3 is a flow diagram of a process control routine included in the TMA of FIG. 2.
Figure 4:
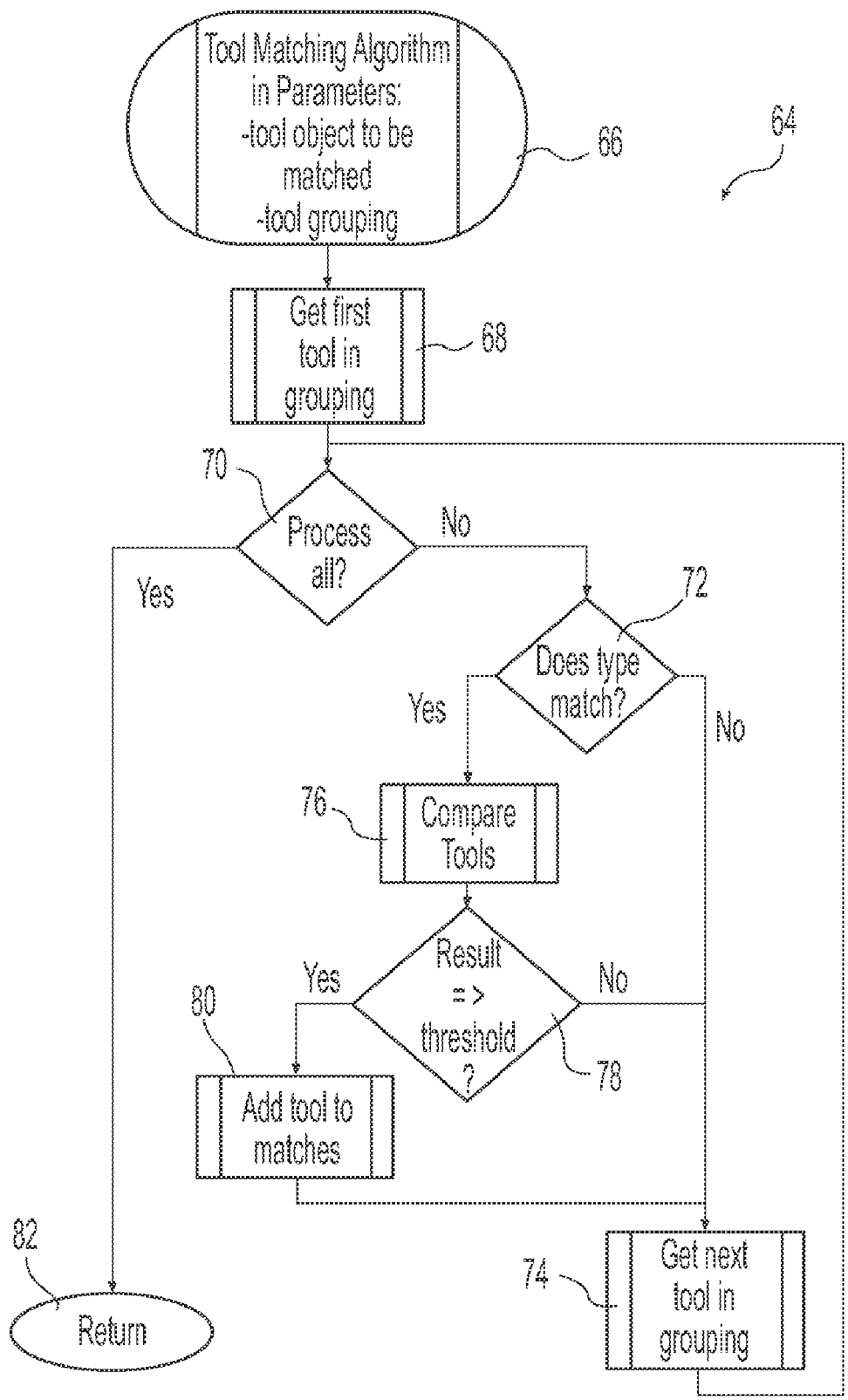
FIG. 4 is a flow diagram of a tool matching algorithm included in the TMA of FIG. 2.

Referring now to FIGS. 3 and 4, step 60 of routine 58 simply indicates that the input parameter for routine 58 is source tool 16. At step 62, routine 58 calls the tool matching algorithm 64 depicted in FIG. 4 to evaluate defined tools 30, 32, 34 of ATC grouping 22. In general, algorithm 64 identifies any defined tools in ATC grouping 22 that satisfy the requirements of source tool 16 (i.e., defined tools that match source tool 16). Step 66 indicates that the input parameters for algorithm 64 are source tool 16 and defined tools 30, 32, 34 of ATC grouping 22. At step 68, algorithm 64 accesses the first defined tool of ATC grouping 22 (i.e., defined tool 30). At step 70, algorithm 64 determines whether all of defined tools 30, 32, 34 in ATC grouping 22 have been processed. At this stage of processing, the result is "no." Accordingly, control is passed to step 72. At step 72, algorithm 64 determines whether the tool type of defined tool 30 matches the tool type of source tool 16. As indicated above, each source tool and each defined tool includes information identifying the type of tool (e.g., drill, end mill, etc.) described by the associated data. In one embodiment of the invention, if the tool types do not match, then there is no point in further investigating the physical characteristics of the tools to determine if they match. As such, if the answer to step 72 is "no," then control is passed to step 74, which causes algorithm 64 to access the next defined tool 32 in ATC grouping 22. Otherwise, control is passed to step 76, where the physical geometries of source tool 16 and defined tool 30 are compared.

At step 76, algorithm 64 accesses information in source tool 16 describing a plurality of physical characteristics of the physical tool specified by source tool 16. For example, source tool 16 may specify a cut diameter value, a shank diameter value, a flute length value, etc. Each of these physical characteristics may be compared to the corresponding data in defined tool 30 to calculate a compatibility index for defined tool 30. The method of computing a compatibility index may vary for each tool type. In some cases, one or more threshold conditions must be satisfied during the comparison in order for it to proceed. For example, when comparing data associated with drills, step 76 may require that the diameters differ by no more than 0.000001 mm, and that the spin directions be identical. Further comparison is skipped unless both threshold conditions are met. In one embodiment of the invention, step 76 compares physical characteristics and computes the compatibility index by applying weighting factors to one or more of these geometry comparisons. For example, some of the physical characteristics may be considered more critical than others, and thus may have a heavier weighting factor. The weighted comparisons result in a compatibility index value, for example, a value between zero and one.

In another embodiment of the invention, the criteria for matching defined tools to source tools are fully configurable by the operator using, for example, an XML-based configuration map accessed by the operator with a graphical user interface. In one implementation of this embodiment, the tool type can be defined as a default criterion that must match for TMA 10 to designate the defined tool as a matched tool, unless the operator overrides the default criterion. The default may further require that the tools being compared have diameters that match to within a specified tolerance (e.g., 0.001 inches), which may also be changed by the operator. The specified tolerance for compared physical characteristics (such as diameter) of the default criteria, as well as the operator configured criteria as described below, may be an absolute value or a relative value. More specifically, the diameter of the tools, for example, may be required to differ by no more than an absolute amount (e.g., 0.001 inches) or by a relative percentage (e.g., one tool has a diameter that matches the other tool's diameter to within 2% of the other tool's diameter). These absolute or relative limitations on tool matching criteria may be associated with any matching criteria described herein.

In this embodiment, certain tools may, by default, also be required to have other matching physical or use characteristics in addition to or less than the tool type and tool diameter characteristics. For example, cutting taps and forming taps may be required to also have identical or nearly identical thread directions and thread pitches, and thread mills may further be required to have identical or nearly identical thread diameters. On the other hand, where the source tool is a probe, the matching tool may only be required to be the identical tool type (i.e., a probe).

Operator configurable matching criteria may include any of the criteria described above, as well as any other criteria relating to a physical or use characteristic of a tool. In general, the operator may be prompted to define a matching criterion for any of the physical or use characteristics associated with a given tool.

In yet another embodiment of the invention, the operator can configure the matching criteria such that the only criterion applied during the matching process is the numeric reference of the tool. This configuration disables the comparison of tool type, physical characteristics, and use information such that a defined tool will match a source tool if their numeric references are the same, regardless of the other characteristics of the tools. When configuring the matching criteria in this manner, the operator should specify that the numeric references must match to an absolute amount between zero and one (non-inclusive), thereby ensuring that only tools with identical numeric references will be considered matches.

At step 78, the compatibility index value is compared to a threshold value. It should be understood, however, that in embodiments where a compatibility index is not computed, but rather tool matching criteria are applied to the tools under consideration, step 78 is a determination of whether the matching criteria are met. In one embodiment of the invention, during the automatic matching process described herein in association with loading of part program 12, the threshold value to which the compatibility index is compared is one, signifying an identical match of source tool 16 with the defined tool currently under consideration. It should be understood, however, that one of ordinary skill in the art may implement a different threshold value to permit matches that are less than identical. Step 78 determines whether the compatibility index value is equal to or exceeds the threshold (or whether the matching criteria are met, as the case may be). If not, then control passes to step 74 where the next defined tool 32 of ATC grouping 22 is accessed. If, on the other hand, the compatibility index value is equal to or greater than the threshold (or the matching criteria are met, as the case may be), control is passed to step 80, where algorithm 64 identifies defined tool 30 as a match with source tool 16 before accessing defined tool 32 at step 74.

When algorithm 64 accesses defined tool 32 of ATC grouping 22, control is returned to step 70 where algorithm 64 determines whether it has processed all of the defined tools in ATC grouping 22. Algorithm 64 continues stepping through defined tools 30, 32, 34 of ATC grouping 22 and comparing them to source tool 16 in the manner described above until all of the defined tools of ATC grouping 22 have been processed. As algorithm 64 processes defined tools 30, 32, 34, it adds defined tools that match source tool 16 (if any) to the list created by step 80. Eventually, all of defined tools 30, 32, 34 of ATC grouping 22 are processed, and the result of step 70 is "yes."

At step 82, control is returned to process control routine 58 of FIG. 3. Having completed step 62, routine 58 performs step 84 which again calls tool matching algorithm 64. During this execution of algorithm 64, all of defined tools 38, 40, 42 of MTC grouping 24 are processed in the manner described above with reference to ATC grouping 22. Any matches are added (at step 80) to the matched tools identified during processing of ATC grouping 22. When all of defined tools 38, 40, 42 of MTC grouping 24 have been processed, control is again returned at step 82 to process control routine 58.

At step 88, process control routine 58 calls tool matching algorithm 64 to process unmatched tools 44, 46, 48 in unmatched grouping 26. It should be understood that multiple part programs 12 may concurrently reside on the machine. In the process of loading these part programs 12, source tools may be added to unmatched tool grouping 26 if they do not match a defined tool in ATC grouping 22 or MTC grouping 24. Later loaded part programs 12 may require source tools that match the unmatched tools from earlier loaded part programs 12. While unmatched tools 44, 46, 48 are not physical tools currently available for use in cutting operations, they may still be used for virtual operations or added, for example, to the MTC if a physical tool corresponding to the unmatched tool is obtained for use. The processing of unmatched tools 44, 46, 47 is the same as that described above with regard to ATC grouping 22 and MTC grouping 24. As should be apparent from the foregoing, if a source tool is matched to an unmatched tool in unmatched tool grouping 26, then the source tool is not added to unmatched tool grouping 26. On the other hand, if a source tool does not match any of defined tools 30, 32, 34 of ATC grouping 22, defined tools 38, 40, 42 of MTC grouping 24, or unmatched tools 44, 46, 48 of unmatched grouping 26, then the source tool is added to tool library 21 as an unmatched tool. In this manner, TMA 10 prevents addition of duplicate unmatched tools to unmatched grouping 26. When a part program 12 is unloaded from the machine, TMA 10 determines whether any unmatched tools from the program are still needed by other part programs. If so, then those unmatched tools are left in unmatched grouping 26. Otherwise, they are removed.

In one embodiment of the invention, at step 90 the various matched tools stored at step 80 of algorithm 64 are sorted to determine the best match with source tool 16. As a result of matching algorithm 64 as described above, all of the matched tools may be identical in geometry to source tool 16 (i.e., if the threshold value to which the compatibility index value is compared is set to one). In other embodiments, the matched tools may not be identical geometric matches. In that case, the primary sorting criteria in step 90 may be the compatibility index, which relates to the quality of the geometric match. Where all of the matched tools are identical in geometry to source tool 16 (or where there is a tie in the compatibility index sorting), the matched tools may be automatically sorted by location. In one embodiment, the location order in terms of preference for sorting is the spindle, the ATC, the MTC, then unmatched tool grouping 26. The spindle is preferred because the tool is already loaded. The ATC is the next preference because the tool will be automatically loaded. The MTC is the next preference because the tool is available for manual loading onto the spindle. Unmatched grouping 26 is the next preference because the unmatched tools, although not physically available for use, are at least geometrically characterized and can be used in virtual operations including verification of part program 12.

Figure 2:
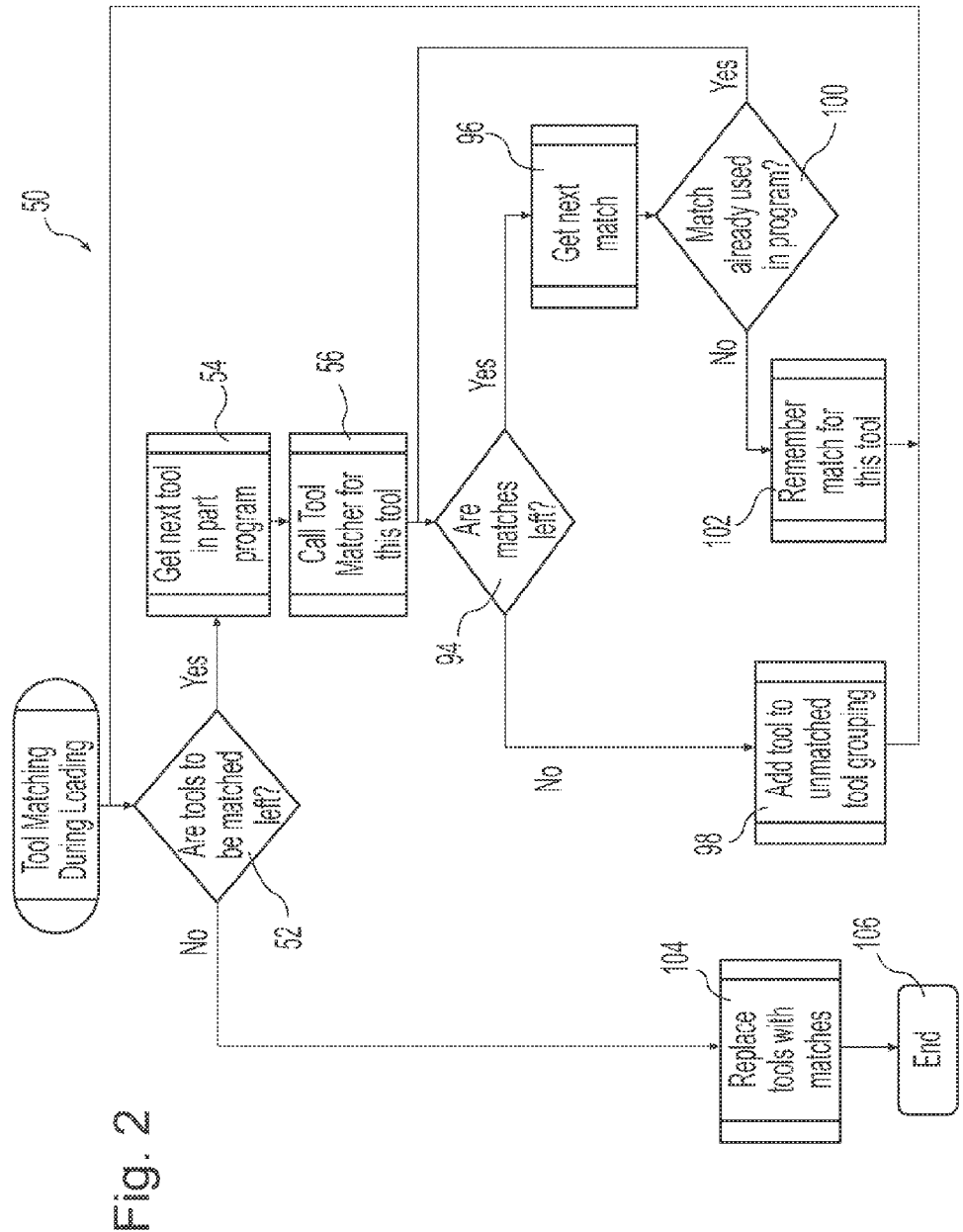
FIG. 2 is a flow diagram of a tool management algorithm ("TMA") according to the present invention.

Referring back to FIG. 3, at step 92 of process control routine 58, control is returned to TMA 10 at step 94 of FIG. 2. At step 94, TMA 10 determines whether all of the sorted and matched tools have been processed. At this point in the process, none of the matched tools have been processed, and control is passed to step 96 where the first matched tool is accessed from the sorted list. If no matches were identified during processing of the defined tools and unmatched tools, or if all of the matched tools had been processed, then the result of step 94 would be "no," and source tool 16 would be added to unmatched grouping 26 at step 98.

For the purpose of explanation, assume that multiple defined tools matched source tool 16 during the processing described above. Assume further that the first matched tool after sorting is defined tool 32, which has a numeric reference of tool 2. Step 100 determines whether the defined tool currently under consideration (here, defined tool 32) has already been matched to a source tool as is further described below. In this example we assume that defined tool 32 has not been associated with any source tool. Accordingly, at step 102 TMA 10 automatically correlates defined tool 32 with source tool 16 of part program 12.

Figure 5:
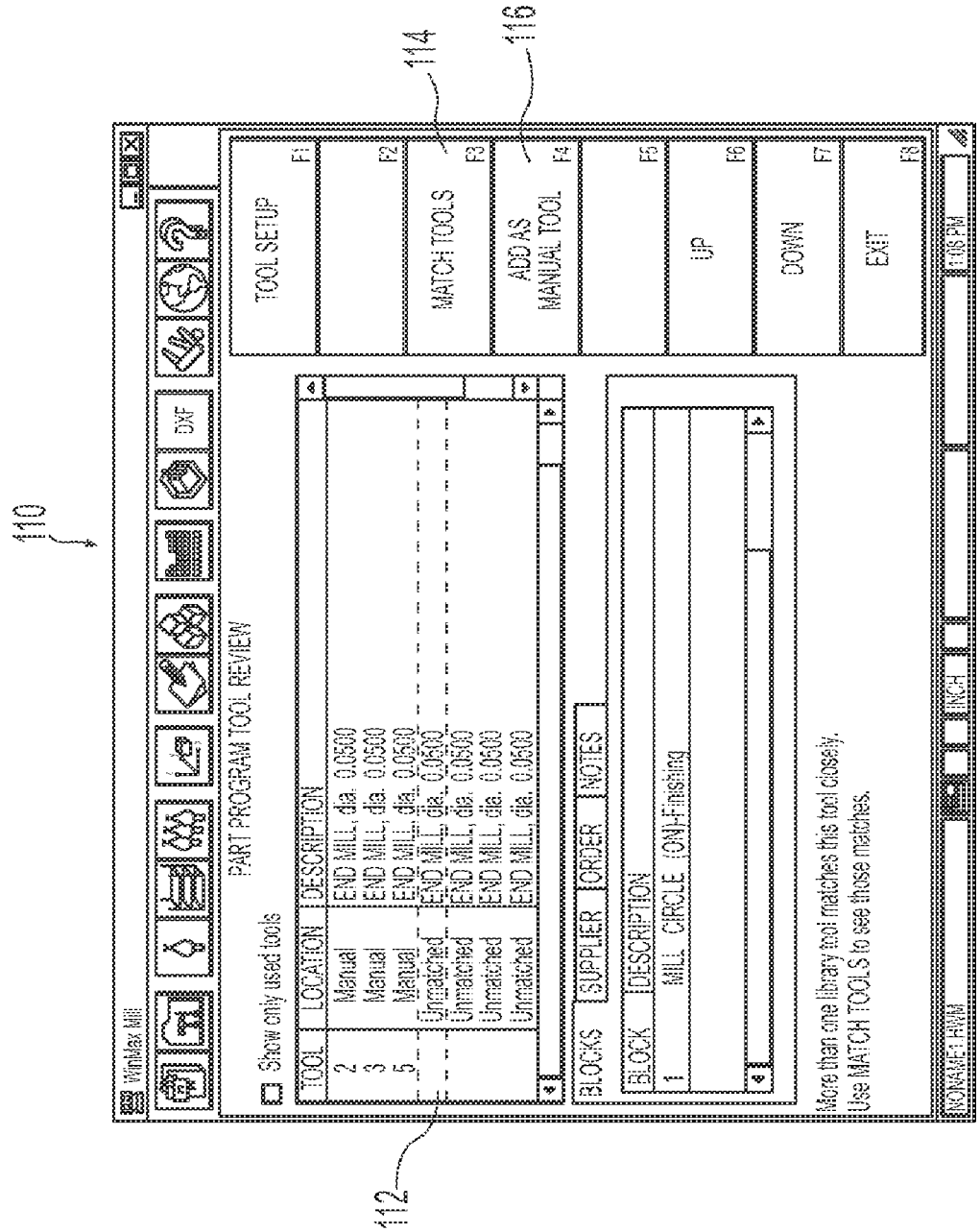
FIG. 5 is a tool review screen generated by software according to the present invention.
Figure 6:
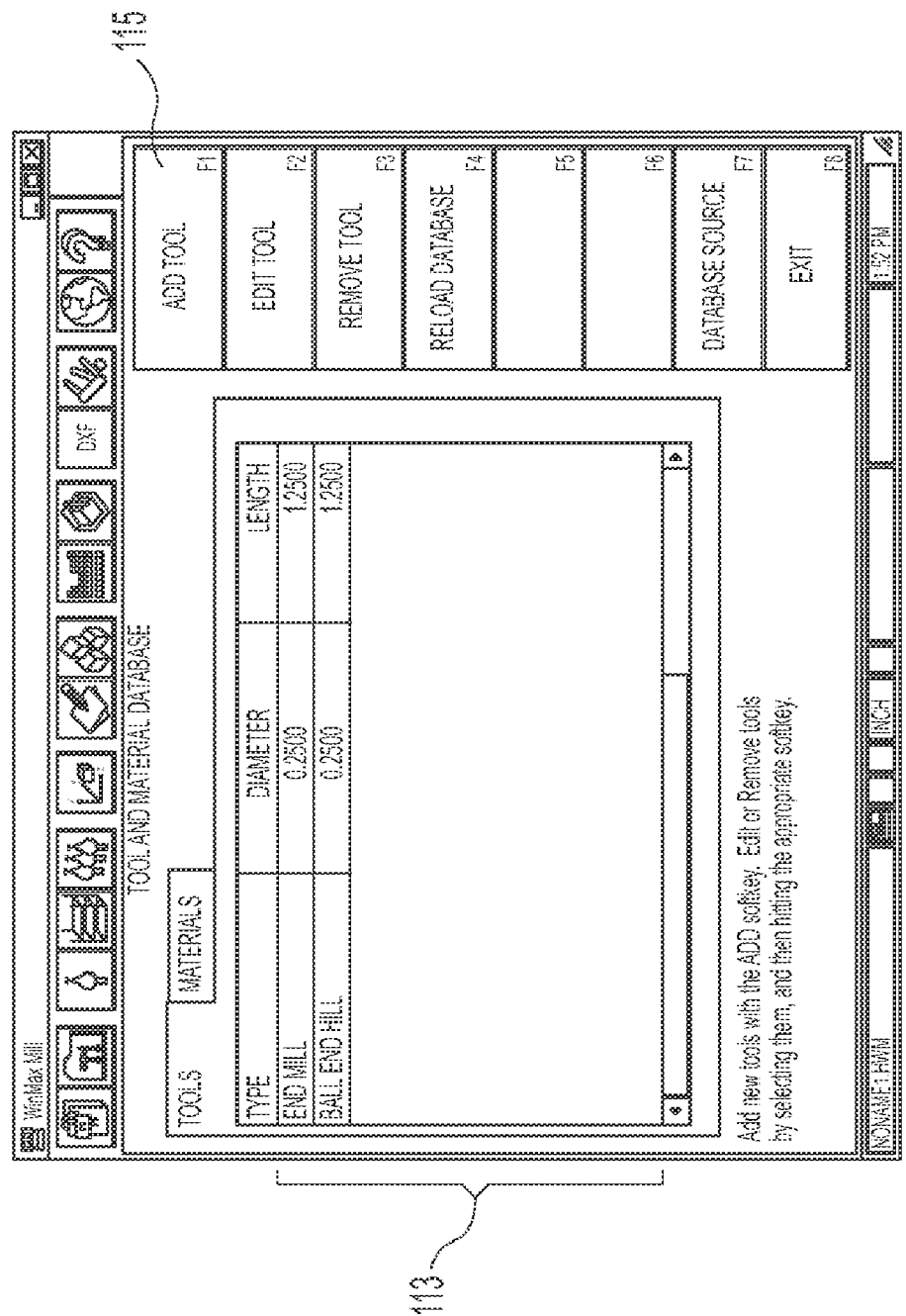
FIG. 6 is a tool creation screen generated by software according to the present invention.

In another embodiment of the invention, the sorted, matched tools are not evaluated automatically to determine the best matching tool. In this embodiment, all of the matched tools are displayed to the operator so that the operator may select the desired matched tool. FIG. 5 depicts a screen 110 wherein all of the defined tools in tool library 21 that satisfy the matching criteria for the source tool (i.e., tool 2, 3, and 5) are displayed to the operator after the operator selects unmatched source tool 112 and clicks on the "match tools" button 114 of screen 110. The operator may select one of the defined tools as the matched tool and the replacement process described below will be executed. If no defined tools satisfy the matching criteria for the source tool, the operator may click on the "add as manual tool" button 116 and initiate the process of creating a new defined tool for tool library 21 in the manner described below.

In another embodiment, the numeric reference for the tools to be matched may be used as the criteria for designating a matching tool. For example, if multiple defined tools satisfy the matching criteria, any defined tool having a numeric reference that is identical to the numeric reference of the source tool may automatically be designated a matched tool. As with all matched tools, the designated matched tool cannot thereafter be matched with another source tool, even if all matching criteria (except numeric tool reference) are met.

In some circumstances, part programs require the use of two identical tools. For example, an end mill of a particular geometry may be required for rough cutting the part, while another end mill of the identical geometry is required for finish cutting. Where this situation exists, TMA 10 needs to ensure that the same matched tool is not associated with both source tools. Step 100 of algorithm 64 provides this feature. In one embodiment, the first source tool would be correlated with the first matched tool accessed in step 96. At step 100, TMA 10 determines that the first matched tool has not yet been matched to a source tool. Thus, at step 102, the first matched tool is correlated with the first source tool.

The second source tool is then processed through steps 52, 54, and 56. As the second source tool is identical to the first, the same matched tools should be identified during this processing, and they will be sorted in the same order. Accordingly, at step 96 TMA 10 will access the first matched tool. At step 100, TMA 10 will determine that the first matched tool has already been associated with a source tool. TMA 10 will then return to step 94. Assuming additional matched tools were identified by tool matching algorithm 64, the result of step 94 will be "yes," and the next matched tool will be accessed at step 96. At step 100, TMA 10 will determine that the second matched tool has not been associated with a source tool. Finally, at step 102 TMA 10 will correlate the second matched tool with the second source tool. In this manner, a defined tool on the machine will not be correlated to two separate, but identical source tools required by part program 12.

After a matched tool is correlated with source tool 16 in the manner described above, TMA 10 returns to step 52 to determine whether additional source tools required by part program 12 need to be matched. Source tool 18 will be accessed at step 54. At step 56, TMA 10 calls process control routine 58, which executes tool matching algorithm 64 for each defined tool of ATC grouping 22 and MTC grouping 24, and each unmatched tool of unmatched grouping 26 in the manner described above. In one embodiment of the invention, one of the sorted matched tools identified during this processing (if any) is then correlated at step 102 with source tool 18 of part program 12. In another embodiment, all of the matched tools identified are displayed to the operator for manual selection. If no matched tools are found, then source tool 18 is added to unmatched grouping 26 at step 98. The numeric reference for source tool 18 when added to unmatched grouping 26 will be the numeric reference associated with source tool 18 (i.e., tool 2) if that numeric reference is not already associated with another defined tool in tool library 21, otherwise it will be the next available numeric reference.

As should be apparent from the foregoing, each of the source tools of part program 12 is processed in the above-described manner to be either matched to a defined tool or unmatched tool in tool library 21 or stored in unmatched grouping 26. Finally, at step 52 TMA 10 will determine that all of the source tools of part program 12 have been processed, and control will pass to step 104 where TMA 10 replaces the original numeric tool references associated with the source tools with the numeric references of the correlated matched tools. When performing this function, TMA 10 first identifies, for each source tool, all operations 16, 18, 20 in part program 12 that use the source tool. Then, TMA 10 replaces the original tool references with the matched tool references identified above. The following example illustrates this process.

Assume in part program 12, three operations exist, and they originally reference the following source tools:
Operation 1: Source tool 1 (roughing); Source tool 2 (finishing)
Operation 2: Source tool 3 (roughing); Source tool 2 (finishing)
Operation 3: Source tool 1 (roughing); Source tool 4 (finishing)

At step 104 of FIG. 2, TMA 10 identifies the operations in part program 12 that use each of the originally referenced source tools:
Source tool 1: Operation 1 (roughing), Operation 3 (roughing)
Source tool 2: Operation 1 (finishing), Operation 2 (finishing)
Source tool 3: Operation 2 (roughing)
Source tool 4: Operation 3 (finishing)

Assume further that during operation of TMA 10 as described above, the following numeric references associated with matched tools were identified:

Source tool 1 matched to matched tool 4
Source tool 2 matched to matched tool 1
Source tool 3 matched to matched tool 2
Source tool 4 matched to matched tool 10

After all of the operations referencing source tools are identified as outline above, the original source tool references are replaced in the following manner:
Replace source tool 1 with matched tool 4 in operation 1 (roughing) and operation 3 (roughing)
Replace source tool 2 with matched tool 1 in operation 1 (finishing) and operation 2 (finishing)
Replace source tool 3 with matched tool 2 in operation 2 (roughing)
Replace source tool 4 with matched tool 10 in operation 3 (finishing)

In this manner, TMA 10 avoids replacing a matched tool reference with another matched tool reference. After this replacement process, TMA 10 ends at step 106.

In one embodiment of the invention, during the above-described replacement process, TMA 10 checks the tool use information (i.e., the feed and speed information) corresponding to the source tools to determine whether that information was manually programmed into part program 12. Some operators modify the default feed and speed information provided with the tool. During creation of part program 12, the feed and speed information may either be imported, for example, from tool database 23 when the tool is defined, or manually entered. If the information is manually entered, then a flag is set in association with the information to indicate manual entry. TMA 10 identifies these flags in making the manual entry determination. In one embodiment of the invention, if the feed and speed information was manually entered, then TMA 10 retains it. If the feed and speed information was not manually entered, then TMA 10 replaces it with the feed and speed information associated with the matched tool during the replacement process described above.

When one or more source tools are added to unmatched grouping 26, an "unmatched tool(s)" message is displayed to the operator after part program 12 is loaded. In one embodiment of the invention, the operator has the option of selecting a tool review screen, which lists all of the source tools and the location of their matches (i.e., the spindle, the ATC, the MTC, or in unmatched grouping 26). If no matched tool was found, the source tool is identified as an "unmatched tool." The operator may match unmatched tools with similar, but not identical, defined tools in ATC grouping 22 or MTC grouping 24. When the operator selects (e.g., clicks on) an unmatched tool on the tool review screen and activates a "find matches" command, TMA 10 is again executed for the selected unmatched tool. For this unmatched tool operation, however, TMA 10 begins execution at step 60 of process control routine 58 and ends execution at step 92 as described below. Additionally, the threshold associated with step 78 of tool matching algorithm 64 is set to zero instead of one.

At step 60, the input parameter is the unmatched tool. Step 62 calls tool matching algorithm 64 of FIG. 4 to locate matching tools in ATC grouping 22 in the manner described above. In one embodiment, at step 86, instead of computing a compatibility index value for each defined tool 30, 32, 34 of the same tool type as the unmatched tool, algorithm 64 sets the compatibility index to zero and assigns a percentage match based on the diameter of the defined tool 30, 32, 34. For example, a defined tool having a diameter that is identical to the diameter specified for the unmatched tool is assigned a percentage match of 100%. A defined tool have a diameter twice the size of the diameter specified for the unmatched tool data block is assigned a percentage match of 200%, and so on.

As the threshold for step 78 is zero during the unmatched tool operation, every defined tool 30, 32, 34 processed by step 78 will be added to the list of matched tools. This same process is performed at steps 84, 86, and 88 of process control routine 58 for defined tools 38, 40, 42 of MTC grouping 24. The list of matched tools may then be sorted at step 90 of process control routine 58 in order of percentage match. Finally, the sorted list of matched tools is displayed to the operator, along with the locations (i.e., the ATC or the MTC) of the matched tools. The operator then selects a matched tool from the list and it is used to replace the previously unmatched source tool required by part program 12 in the manner described above.

As was indicated above, a tool matched to a source tool required by part program 12 need not have a corresponding physical tool on the machine (i.e., a tool in the spindle, the ATC, or the MTC). If the operator executes part program 12 and a source tool has been correlated to an unmatched tool of unmatched grouping 26, then TMA 10 will display a message to the operator indicating that a physical tool is not present for one or more of the source tools. The operator may load a physical tool on the machine by placing it, for example, in the ATC and creating a corresponding defined tool in tool library 21. Alternatively, the operator may select an option of defining the tool and adding it to the MTC for manual loading at the appropriate time. Even if the operator does not obtain a physical tool, the operator may cause the machine to perform virtual operations using the unmatched tool such as a graphical verification of part program 12.

In addition to its use during loading of part program 12 and manual matching of unmatched tools, TMA 10 may be used when defined tools are added to tool library 21. Tool library 21 may be updated with new defined tools from part programs or back-up files, with defined tools located in a central library server, etc. Regardless of the source of the defined tool for importation into tool library 21, TMA 10 may be executed to prevent importation of duplicate defined tools.

For example, an operator may identify a source tool in a part program that the operator would like to import to tool library 21 of a particular machine. Instead of executing the tool matching process of TMA 10 described above, the operator may execute a tool importation process wherein all source tools in the part program are imported into tool library 21 if they do not already exist in tool library 21. After assembling the list of source tools referenced in part program 12 in the manner described above, TMA 10 accesses the first source tool (steps 52 and 54), and calls process control routine 58 (step 56). The input parameter at step 60 of routine 58 is the first source tool. At step 62, TMA 10 calls tool matching algorithm 64 to compared defined tools 30, 32, 34 of ATC grouping 22 to the first source tool in the manner described above. In this application of TMA 10, the compared tools must be identical to be considered a match. If a matched tool is identified, the first source tool is not imported into tool library 21 because it would constitute a duplicate. If no matched tool is identified, defined tools 38, 40, 42 of MTC grouping 24 are processed (step 84) in the same manner. Again, if a match is found, the source tool is not added to tool library 21. If none of the defined tools in ATC grouping 22 or MTC grouping 24 match the source tool, it is added to tool library 21. This procedure is repeated for the remaining source tools.

Figure 7:
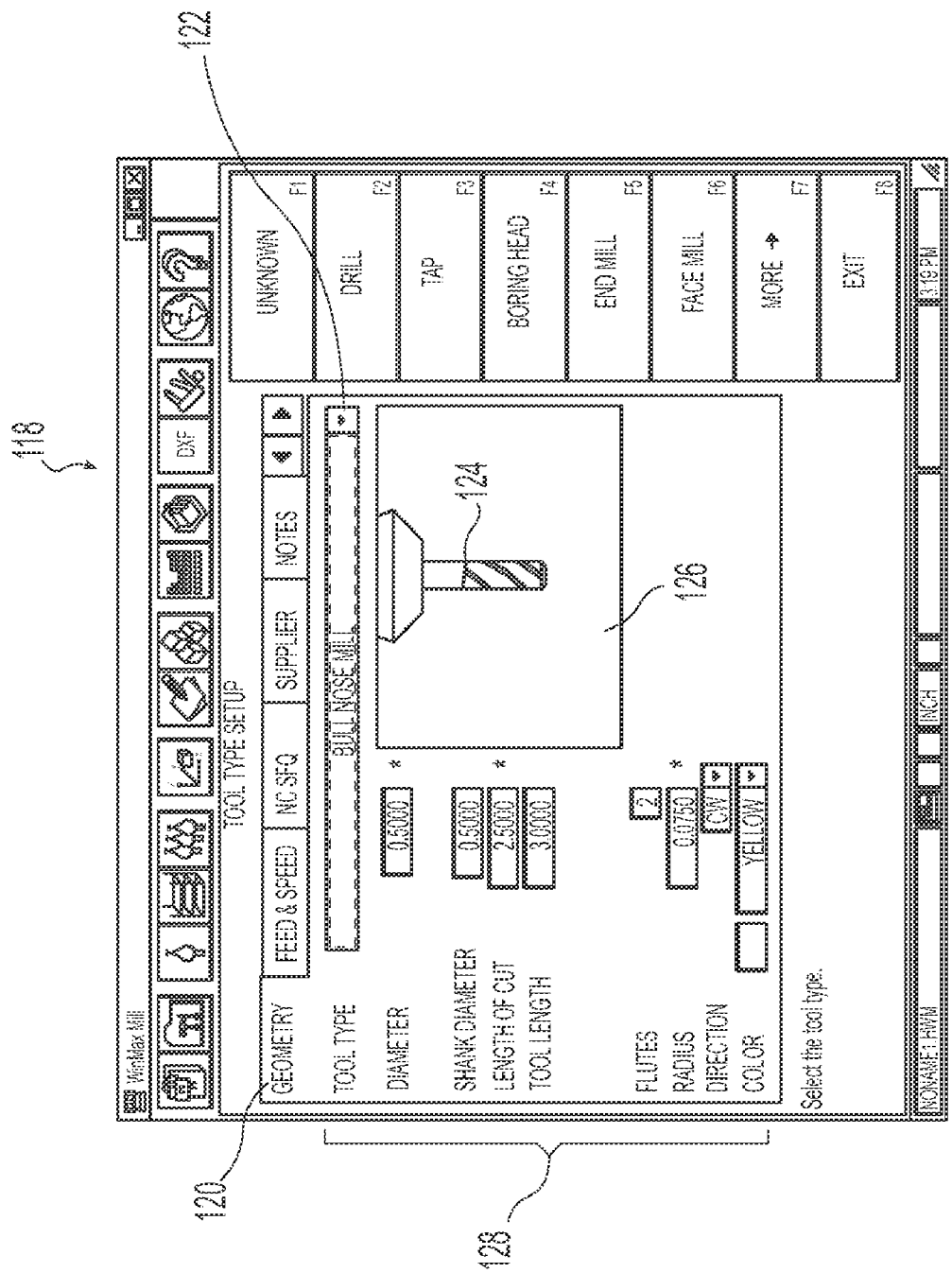

FIGS. 6 through 9 depict screens used by the operator to populate database 23 with information used to define tools for addition to tool library 21. Screen 111 of FIG. 6 displays (in area 113) a list of available tool templates stored in database 23. A new template can be created by selecting the "add tool" button 115. When button 115 is selected, screen 118 of FIG. 7 is displayed with the geometry tab 120 active by default. In screen 118 of FIG. 7, the operator has selected the new template's tool type (bull nose mill) from a list displayed using drop down icon 122. An image 124 of the selected tool is displayed in area 126. The operator then enters (or selects) the physical characteristics of the tool as shown in the remaining cells 128 of screen 118.

Figure 8:
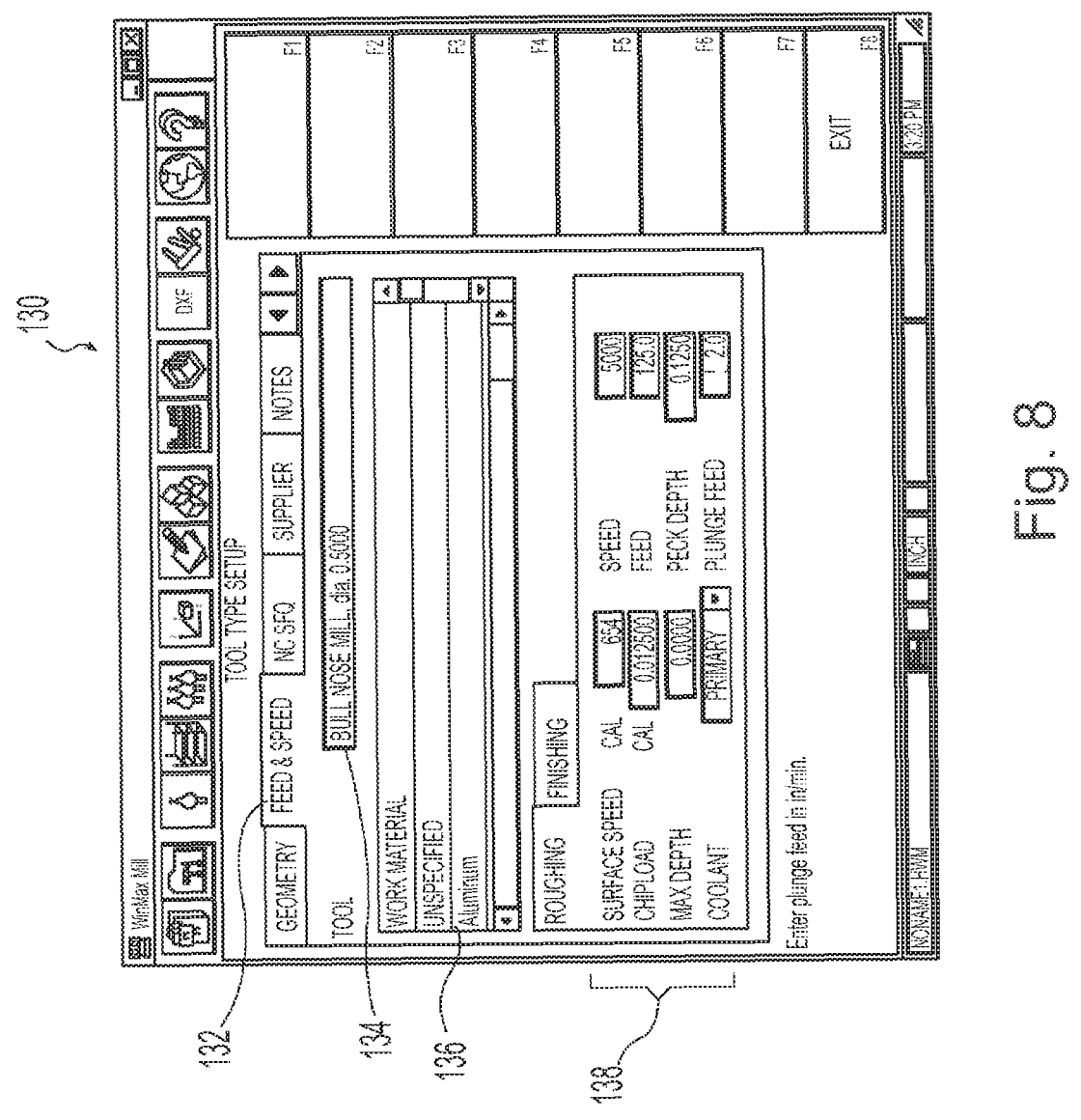

In screen 130 of FIG. 8, the operator has selected the feed and speed tab 132. The tool name is displayed in cell 134, and a list of work materials are displayed in area 136. The operator has selected aluminum from the list, and populated the feed and speed information (area 138) to be associated with the tool for roughing operations. All of the above described data is stored in database 23 as a template and may later be used to define a tool for storage in tool library 21 as described below.

Figure 9:
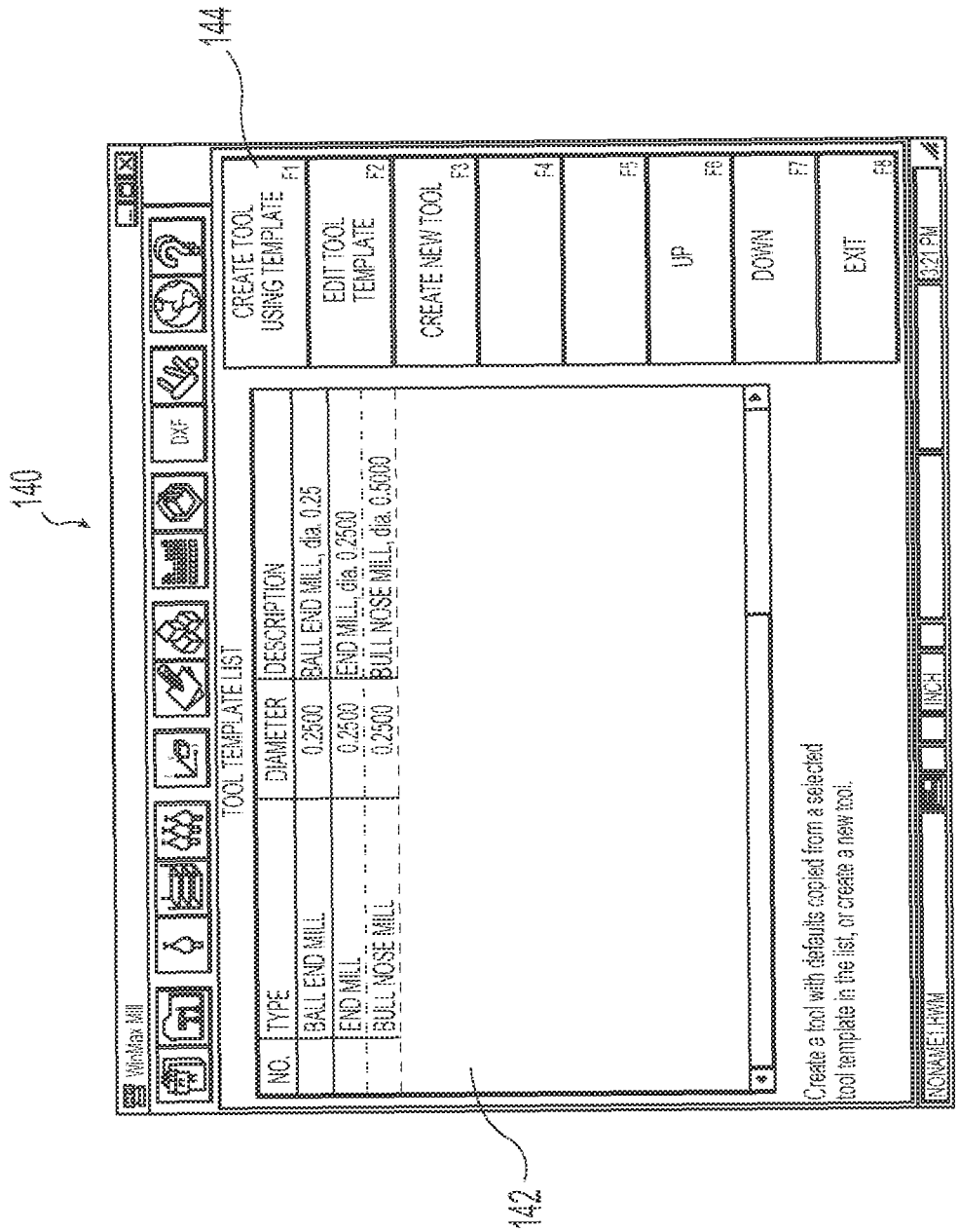
FIG. 9 is a tool template screen generated by software according to the present invention.

In the process of defining tools for storage in tool library 21 using database 23, the operator may begin by selecting a tool template. FIG. 9 shows a screen 140 listing the previously defined templates (area 142) stored in database 23 as a result of the process described above. The operator may select a template from the list, and click on button 144 to begin the process of defining a tool for storage in tool library 21 using the template. Upon clicking button 144, the tool is assigned the next available (i.e., unused) numeric reference by default. The operator may, however, overwrite the default reference with any available numeric reference.

Figure 10:
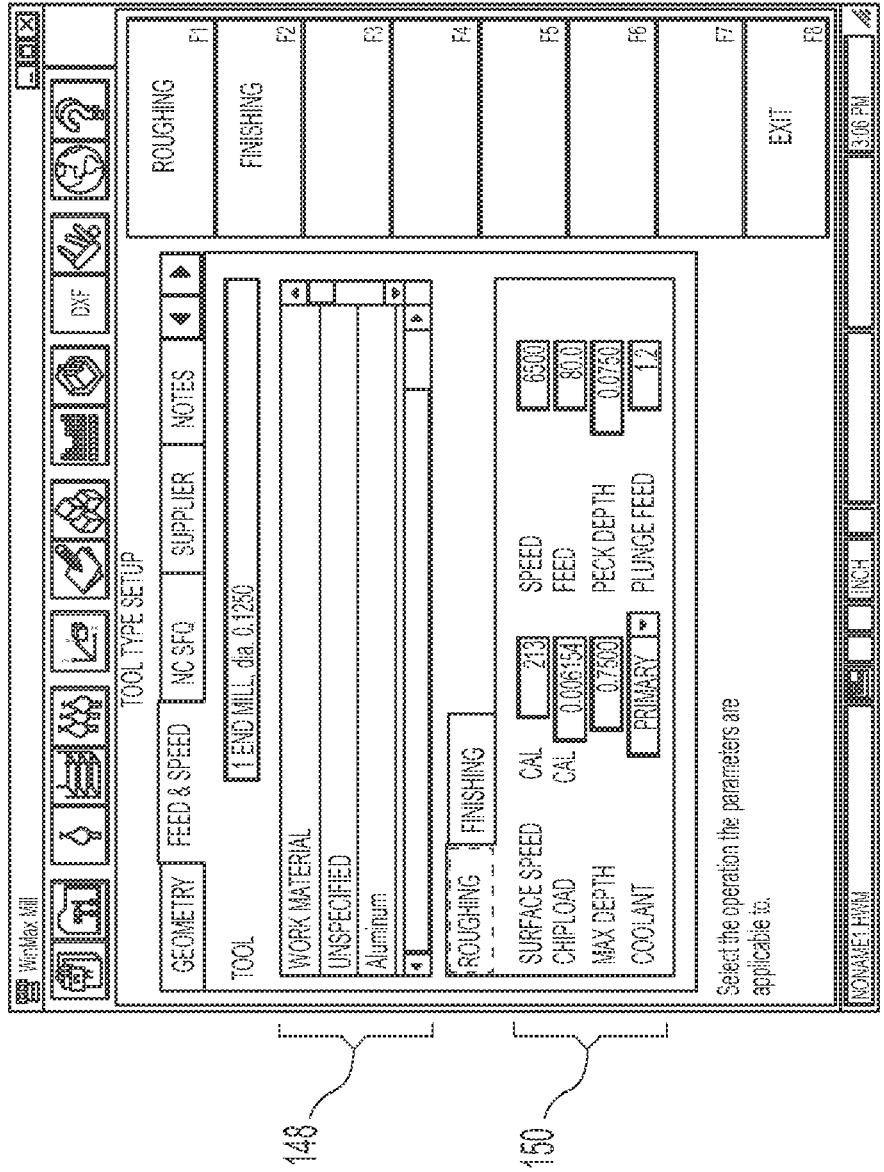
FIG. 10 is another tool set up screen generated by software according to the present invention.

FIG. 10 shows a screen 146 wherein the operator has begun defining an end mill for addition to tool library 21. The operator is presented with a selection of materials (area 148) for the tool to remove. This list of potential workpiece materials (area 148) is populated with all entries programmed into material database 25 (FIG. 1). In the depicted example, the operator has selected steel. Screen 146 displays the previously entered feed and speed specifications (area 150) for the selected tool and the selected material type by accessing database 25. It should be understood that the data depicted in area 150 could have been manually entered by an operator as described above, or imported directly from the tool manufacturer either from a portable storage medium or over a communications network.

Figure 11:
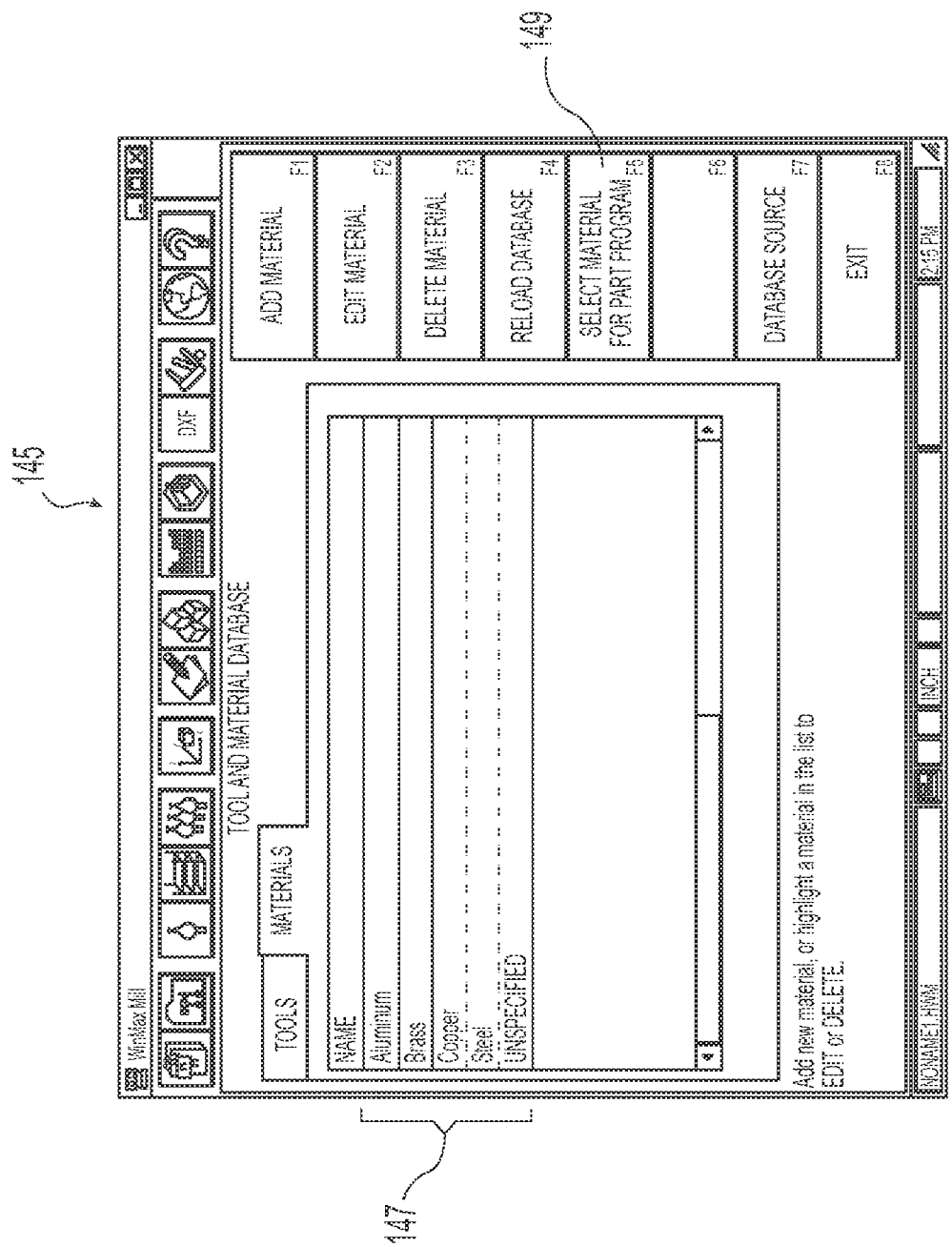
FIG. 11 is a material database interface screen generated by software according to the present invention.
Figure 12:
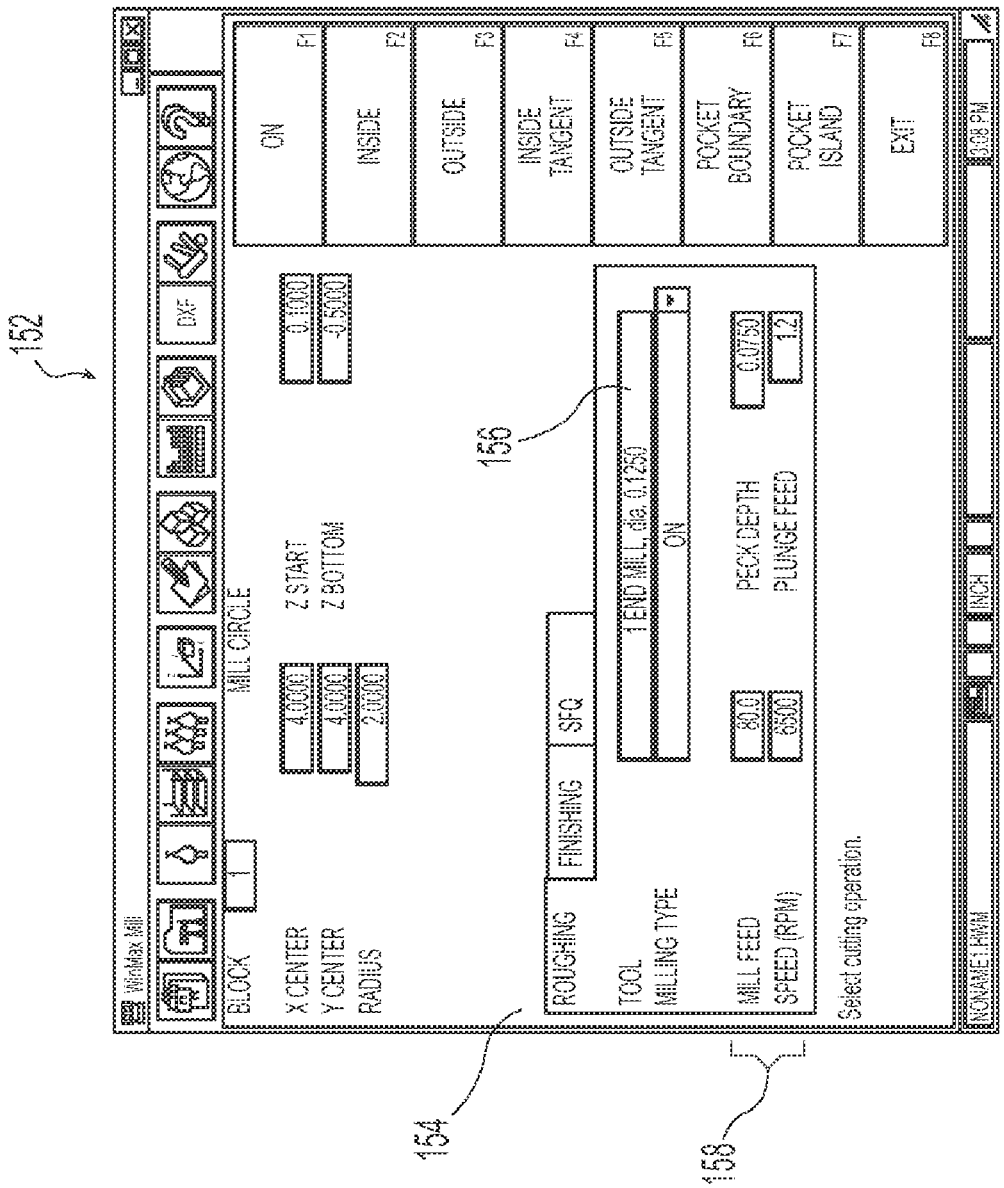
FIG. 12 is an interface for creation of a part program generated by software according to the present invention.

The material and operation specific feeds and speeds defined for any tool will be automatically applied when the tool is entered in a data block or operation of a part program 12. In screen 145 of FIG. 11, the operator sets the workpiece material to be cut for part program 12 by selecting a material from the list 147 and selecting the "select material for part program" button 149. Screen 152 of FIG. 12 is an example of the interface used by the operator in creation of a conversational programming block or operation of part program 12. As shown, the operator is defining a mill circle operation designated block 1. When the operator selects the roughing tab 154 and chooses the tool as shown in cell 156, the feed and speed specifications of screen 146 are automatically populated in area 158 and associated with the roughing operation for block 1.

While this invention has been described as having exemplary embodiments, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A method of correlating tools associated with a cutting machine and tools specified by a program executed by the cutting machine to form a part, the method including the steps of:
identifying source tools specified by the program;
comparing each source tool with defined tools associated with the cutting machine;
designating matched tools, which are defined tools that match the source tools during the comparing step; and
replacing source tool references in the program with references to corresponding matched tools.

2. The method of claim 1, wherein the comparing step includes the step of comparing a tool type identifier of the source tool with tool type identifiers of the defined tools.

3. The method of claim 1, wherein the comparing step includes the step of comparing a physical characteristic of the source tool with a physical characteristic of each defined tool.

4. The method of claim 3, wherein the comparing step includes the step of computing a compatibility index value based on the physical characteristic comparison and comparing the compatibility index value to a threshold value.

5. The method of claim 1, wherein the comparing step includes the step of computing a compatibility index value by applying weighting factors to a plurality of comparisons of physical characteristics of a source tool with physical characteristics of a defined tool.

6. The method of claim 5, wherein the designating step includes the step of determining that the compatibility index value at least meets the threshold value.

7. The method of claim 3, wherein the designating step includes the step of determining that the physical characteristic of a defined tool matches the physical characteristic of the source tool.

8. The method of claim 7, wherein in the determining step, the physical characteristics match when they are within a specified tolerance of one another.

9. The method of claim 8, wherein the specified tolerance is an absolute value.

10. The method of claim 8, wherein the specified tolerance is a relative value.

11. The method of claim 1, further including the step of sorting matched tools.

12. The method of claim 11, wherein the sorting step includes using matched tool location as a sorting criterion.

13. The method of claim 11, wherein the sorting step includes using matched tool compatibility index value as a sorting criterion.

14. The method of claim 11, further including the step of determining a matched tool to correlate with a source tool based on an outcome of the sorting step.

15. The method of claim 1, wherein the replacing step includes the steps of identifying any references in the program to a first source tool and replacing all reference to the first source tool with references to a matched tool before replacing references to a second source tool with references to a matched tool.

16. The method of claim 1, wherein the replacing step includes the step of replacing tool use information associated with a source tool with tool use information associated with a matched tool.

17. The method of claim 16, including the step of identifying manually entered tool use information associated with the source tool.

18. The method of claim 1, wherein the comparing step includes the steps of comparing each source tool to defined tools corresponding to physical tools available for use by the cutting machine and comparing each source tool to defined tools that do not correspond to physical tools available for use by the cutting machine.

19. The method of claim 1, further including the step of displaying a message to an operator when no defined tools match the source tool.

20. The method of claim 1, wherein in the designating step, a defined tool matches a source tool only if a physical characteristic of the defined tool is identical to a physical characteristic of the source tool.

21. The method of claim 1, further including the steps of displaying a plurality of defined tools that do not match a source tool and enabling an operator to select a defined tool from the plurality of defined tools to designate as a matched tool.

22. The method of claim 1, wherein a defined tool is designated a matched tool only after determining that the defined tool had not previously been designated a matched tool.

23. The method of claim 1, further including the step of storing a source tool in a memory as a new defined tool associated with the cutting machine if the defined tools associated with the cutting machine do not match the source tool.

24. The method of claim 23, further including the step of removing the stored source tool from the memory upon removal of the program from the machine unless another program associated with the cutting machine includes a source tool that matches the stored source tool.

25. The method of claim 1, further including the step of loading the program into a memory associated with the cutting machine.

26. The method of claim 23, wherein the storing step is performed as to a particular source tool only after the step of determining that the particular source tool does not match any other source tool stored in the memory.

27. The method of claim 1, further including the step of accessing a database stored in a memory associated with the cutting machine to create a defined tool.

28. The method of claim 27, wherein the database contains workpiece material information, tool physical characteristics information, and tool use information.

29. The method of claim 1, further including the step of accessing a database stored in a memory associated with the cutting machine to create a source tool.

30. The method of claim 1, further including the step of accessing a map that associates tool references to physical locations of corresponding tools.

31. The method of claim 1, wherein the comparing step includes the steps of providing default matching criteria, enabling the operator to modify the default matching criteria, and comparing a source tool with a defined tool using operator-modified matching criteria.

32. The method of claim 31, wherein the enabling step includes the step of displaying a graphical user interface.

33. The method of claim 1, further including the step of adding a source tool to a memory associated with the cutting machine if the source tool does not match the defined tools.

34. The method of claim 1, wherein the designating step includes the steps of determining that none of the defined tools match a source tool, displaying a plurality of defined tools as options for correlating to the unmatched source tool, and enabling the operator to select a displayed defined tool as a matched tool.

35. The method of claim 1, further including the step of using a matched tool to perform a virtual operation.

36. A computer readable medium having computer-executable instructions for correlating tools associated with a machine tool system with tools specified by a program for use in forming a part, the computer executable instructions including:

an algorithm for identifying source tools specified by the program;

a tool matching algorithm for comparing each source tool with defined tools associated with the machine tool system, and designating as matched tools any defined tools that are acceptably similar to the source tools; and an algorithm for replacing source tool references in the program with references to corresponding matched tools.

37. An apparatus for machining a part using a plurality of tools associated with the apparatus as specified by source tools including in a program processed by the apparatus, the apparatus including:

a spindle;

an automatic tool changer configured to load tools onto the spindle; and a memory including a tool management algorithm for identifying source tools specified by the program, a tool matching algorithm for comparing each source tool with defined tools associated with the apparatus, and designating as matched tools any defined tools that are acceptably similar to the source tools, and an algorithm for replacing source tool references in the program with references to corresponding matched tools.

\* \* \* \* \*